US008588291B2

(12) United States Patent
Karaoguz et al.

(10) Patent No.: US 8,588,291 B2
(45) Date of Patent: Nov. 19, 2013

(54) MULTIPLE DECODE USER INTERFACE

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 2030 days.

(21) Appl. No.: 10/874,636

(22) Filed: Jun. 23, 2004

(65) Prior Publication Data

US 2005/0063459 A1  Mar. 24, 2005

Related U.S. Application Data

(60) Provisional application No. 60/504,867, filed on Sep. 22, 2003.

(51) Int. Cl.
*H04N 7/12* (2006.01)
*H04B 1/66* (2006.01)

(52) U.S. Cl.
USPC ............................................... 375/240.01

(58) Field of Classification Search
USPC ............ 375/240.01–240.06, 240.12–240.16, 375/240.26–240.29
See application file for complete search history.

(56) References Cited

U.S. PATENT DOCUMENTS

| | | | | |
|---|---|---|---|---|
| 5,502,493 A * | 3/1996 | Meyer | ...................... | 375/240.26 |
| 5,649,052 A * | 7/1997 | Kim | ............................ | 704/226 |
| 5,686,916 A * | 11/1997 | Bakhmutsky | .................. | 341/67 |
| 5,805,220 A * | 9/1998 | Keesman et al. | ........ | 375/240.01 |
| 5,872,784 A * | 2/1999 | Rostoker et al. | ......... | 370/395.64 |
| 5,933,192 A * | 8/1999 | Crosby et al. | ............. | 375/240.25 |
| 5,946,052 A * | 8/1999 | Ozkan et al. | .................. | 348/555 |
| 6,512,794 B1 * | 1/2003 | Fujiwara et al. | ......... | 375/240.26 |
| 6,539,120 B1 * | 3/2003 | Sita et al. | ...................... | 382/233 |
| 6,631,163 B1 * | 10/2003 | Peng | ........................ | 375/240.25 |
| 6,829,301 B1 * | 12/2004 | Tinker et al. | ............. | 375/240.12 |
| 6,977,877 B2 * | 12/2005 | Mori | .......................... | 369/47.24 |
| 7,039,116 B1 * | 5/2006 | Zhang et al. | ............. | 375/240.26 |
| 7,180,901 B2 * | 2/2007 | Chang et al. | ............. | 370/395.64 |
| 7,245,665 B2 * | 7/2007 | Ueda et al. | ............... | 375/240.28 |
| 7,548,586 B1 * | 6/2009 | Mimar | ..................... | 375/240.26 |
| 8,284,844 B2 * | 10/2012 | MacInnis et al. | ......... | 375/240.25 |

OTHER PUBLICATIONS

T.Wiegand, G.J. Sullivan, G. Bjøntegaard, A.Luthra: *Overview of the H.264/AVC Video Coding Standard*. IEEE Transactions on Circuits and Systems for Video Technology, vol. 13, No. 7, Jul. 2003.

* cited by examiner

*Primary Examiner* — Nhon Diep
(74) *Attorney, Agent, or Firm* — Brinks Gilson & Lione

(57) ABSTRACT

A system for processing information received from a plurality of source devices. Various aspects of the present invention provide a first video generating device that produces a first video output that comprises compressed video information representative of a sequence of video frames, the compressed video information comprising inter-frame comparison information. A second video generating device is also provided, which produces a second video output. A processing module is communicatively coupled to the first and second video generating devices and independent of such devices. The processing module may decompress the first video output from the first video generating device. A video presentation device is provided, which may generate a display corresponding to the first video output via the processing module and a display corresponding to the second video output via the processing module. Generally analogous components for processing audio information are also provided.

27 Claims, 3 Drawing Sheets

MULTIPLE DECODE USER INTERFACE

CROSS-REFERENCE TO RELATED APPLICATIONS/INCORPORATION BY REFERENCE

This patent application is related to and claims priority from provisional patent application Ser. No. 60/504,867, filed Sep. 22, 2003, and titled "MULTIPLE DECODE USER INTERFACE", the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic information consumption environment, a user or multiple users may desire to consume information from various information sources. Such sources may include, for example, audio and video source devices. Such devices may include, for example, DVD players, television receivers, VCRs, cameras, stereo systems, PDAs, computer systems, portable music devices, etc. Each information source device potentially utilizes a unique encoding or compression technology for communicating information. An information source device may, for example, utilize encoding or compression technology to efficiently utilize communication bandwidth between the information source device and information presentation apparatus. Additionally, some of such information source devices may not utilize any encoding or compression.

A user may desire to consume information from the various information sources serially or simultaneously on a single information presentation system. Current information presentation systems do not provide the user the capability to flexibly consume information from various information sources. For example, current information presentation systems do not provide the user the capability to consume information from various information sources when at least a portion of the information may be compressed according to a compression technique and another portion of the information may be compressed according to a different compression technique or not compressed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system is provided for processing information received from a plurality of information source devices. Various aspects of the present invention provide a first video generating device that produces a first video output that comprises compressed video information representative of a sequence of video frames. The compressed video information may comprise inter-frame comparison information. A second video generating device is also provided, which produces a second video output. The second video output may, for example, comprise compressed video information representative of a sequence of video frames. Such compressed video information may comprise inter-frame comparison information.

Various aspects of the present invention provide a processing module communicatively coupled to the first and second video generating devices. The processing module may decompress the first video output from the first video generating device. The processing module may also, for example, decompress the second video output from the second video device if necessary. The processing module may be capable of decompressing received information that has been compressed according to any of a plurality of compression techniques. The processing module may, for example, comprise a single decompression engine or a plurality of decompression engines. The processing module may comprise circuitry to direct received information to an appropriate decompression engine or sub-section of a decompression engine. The processing module may also, for example, process a plurality of information streams simultaneously, each compressed according to a respective compression technique. The processing module may further, for example, process a plurality of information streams, at least one of which comprises compressed information and at least one of which does not comprise compressed information.

Various aspects of the present invention provide a video presentation device communicatively coupled to the processing module. The video presentation device may generate a display corresponding to information of the first video output received via the processing module and a display corresponding to information of the second video output received via the processing module. The video presentation device may, for example, generate a first display window corresponding to the first video output information and a second display window corresponding to the second video output information. The video presentation device may generate such display windows serially or in parallel.

Various aspects of the present invention also provide generally analogous components and techniques for processing audio and audio/video information. Thus, the various aspects of the present invention described herein generally apply to video, audio, audio/video, and other information presentation systems.

These and other advantages, aspects and novel features of the present invention, as well as details of illustrative aspects thereof, will be more fully understood from the following description and drawings.

DETAILED DESCRIPTION OF THE INVENTION

Figure 1:
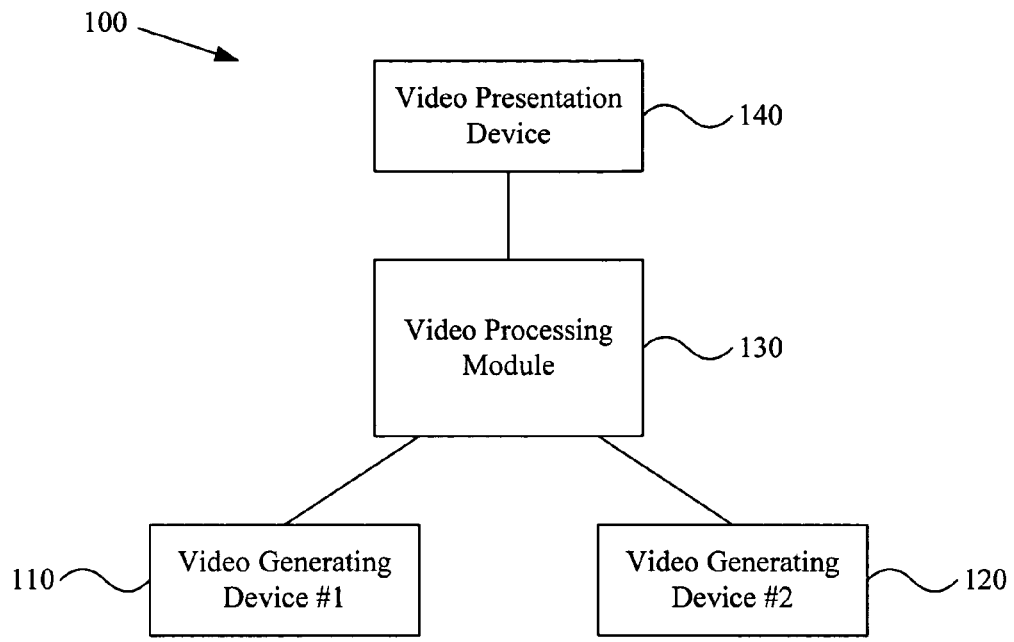
FIG. 1 is a diagram illustrating a video processing system in accordance with various aspects of the present invention.

FIG. 1 is a diagram illustrating a video processing system 100 in accordance with various aspects of the present invention. The video processing system 100 includes a first video generating device 110 and a second video generating device 120. The video processing system 100 also includes a video processing module 130 communicatively coupled to the first video generating device 110 and the second video generating device 120. The video processing system 100 further includes a video presentation device 140 communicatively coupled to the video processing module 130.

The first video generating device 110 may produce a first video output. The first video output may include compressed video information representative of a sequence of video frames. The compressed video information, in turn, may include information of inter-frame comparison. For example and without limitation, the compressed video information may include information compressed utilizing MPEG, DivX, XViD or ASF compression. The first video generating device 110 may include, for example, a camera monitor system, a computing system, a personal video recording system, a digital video disk player, a personal digital assistant, a pocket computer, a telephone, a video conferencing receiver, an intercom system, a satellite receiver or a television receiver.

The second video generating device 120 may produce a second video output. The second video output may include non-compressed video information. Alternatively, for example, the second video output may include compressed video information representative of a sequence of video frames. The compressed video information, in turn, may include information of inter-frame comparison. For example and without limitation, the compressed video information may include information compressed utilizing MPEG, DivX, XViD or ASF compression. The second video output may include video information compressed utilizing the same compression technique as used to generate the first video output. Alternatively, for example, the second video output may include video information compressed utilizing a different compression technique than used to generate the first video output. The second video generating device 120 may include, for example, a camera monitor system, a computing system, a personal video recording system, a digital video disk player, a personal digital assistant, a pocket computer, a telephone, a video conferencing receiver, an intercom system, a satellite receiver or a television receiver.

The video processing module 130 is communicatively coupled to the first video generating device 110 and the second video generating device 120. The video processing module 130 is also independent of the first video generating device 110 and the second video generating device 120.

The video processing module 130 is capable of decompressing the information included in the first video output and outputting a signal that includes corresponding decompressed information. Further, the video processing module 130 may be capable of decompressing the information included in the second video output and outputting a signal that includes corresponding decompressed information. In addition, the video processing module 130 may be capable of decompressing the information included in the first video output and second video output simultaneously. Alternatively, for example, the video processing module 130 may process the first video output using decompression and process the second video output not using decompression.

The video processing module 130 may perform decompression processing utilizing a single decompression engine or multiple decompression engines. For example, the video processing module 130 may include a single decompression engine with a single decompression processor. Such a single decompression processor may be hardware or software based and may perform simultaneous decompression by time-sharing the single decompression processor between multiple streams of compressed information. Alternatively, the video processing module 130 may include multiple decompression engines. Such multiple decompression engines may perform decompression processing on a single information stream or multiple information streams simultaneously.

The video presentation device 140 is communicatively coupled to the video processing module 130. The video presentation device 140 may receive information of the first video output and the second video output from the video processing module 130. The video presentation device 140 may then generate a display corresponding to the first video output and the second video output. The video presentation device 140 may, for example, include a screen on which to present information to a user in visually perceivable form. The video presentation device 140 may, for example, generate a first display window on a screen that corresponds to the information of the first video output that the video presentation device 140 receives from the video processing module 130. The video presentation device 140 may also, for example, generate a second display window on a screen that corresponds to the information of the second video output that the video presentation device 140 receives from the video processing module 130.

The video processing module 130 is independent of the first video output device 110 and the second video output device 120. However, the video processing module 130 may be integrated with the video presentation device 140. The video processing module 130 may alternatively be a stand-alone device, independent of all other system devices. The video processing module 130 may, for example, be integrated into a single integrated circuit or a single circuit board.

Figure 2:
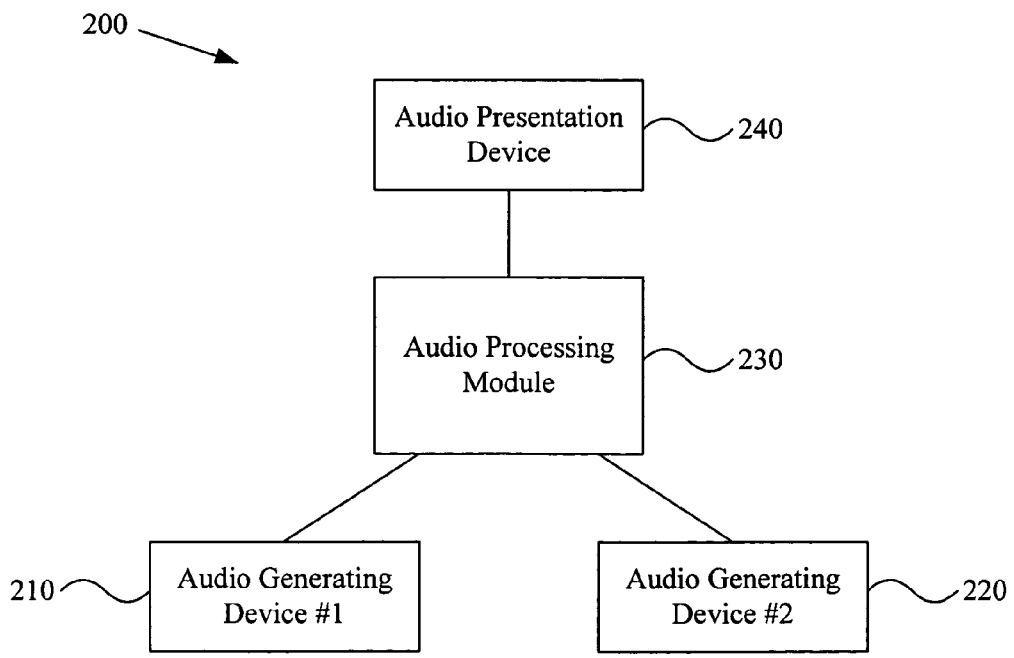
FIG. 2 is a diagram illustrating an audio processing system in accordance with various aspects of the present invention.

Various aspects of the present invention apply to audio information presentation, audio/video information presentation, and other forms of information presentation as well as to video information presentation. FIG. 2 is a diagram illustrating an audio processing system 200 in accordance with various aspects of the present invention. The audio processing system 200 includes a first audio generating device 210 and a second audio generating device 220. The audio processing system 200 also includes an audio processing module 230 communicatively coupled to the first audio generating device 210 and the second audio generating device 220. The audio processing system 200 further includes an audio presentation device 240 communicatively coupled to the audio processing module 230.

The first audio generating device 210 produces a first audio output. The first audio output may include compressed audio information. For example and without limitation, the compressed audio information may include information compressed utilizing WAV, MP3 and/or AC3 compression. The first audio generating device 210 may, for example, include an audio monitor system, a computing system, a personal video recording system, a digital video disk player, a personal digital assistant, a pocket computer, a telephone, a video conferencing receiver, an intercom system, a satellite receiver, a cable television receiver or a portable music player.

The second audio generating device 220 may produce a second audio output. The second audio output may include non-compressed audio information. Alternatively, for example, the second audio output may include compressed audio information. For example and without limitation, the compressed audio information may include information compressed utilizing WAV, MP3 and/or AC3 compression. The second audio output may include audio information compressed utilizing the same compression technique as used to generate the first audio output. Alternatively, for example, the second audio output may include audio information compressed utilizing a different compression technique than used to generate the first audio output. The second audio generating device 220 may, for example, include an audio monitor system, a computing system, a personal video recording system, a digital video disk player, a personal digital assistant, a pocket computer, a telephone, a video conferencing receiver, an intercom system, a satellite receiver, a cable television receiver or a portable music player.

The audio processing module 230 is communicatively coupled to the first audio generating device 210 and the second audio generating device 220. The audio processing module 230 is also independent of the first audio generating device 210 and the second audio generating device 220.

The audio processing module 230 is capable of decompressing the information included in the first audio output and outputting a signal that includes corresponding decompressed information. Further, the audio processing module 230 may be capable of decompressing the information included in the second audio output and outputting a signal that includes corresponding decompressed information. In addition, the audio processing module 230 may be capable of decompressing the information included in the first audio output and second audio output simultaneously. Alternatively, for example, the audio processing module 230 may process the first audio output using decompression and process the second audio output not using decompression.

The audio processing module 230 may perform decompression processing utilizing a single decompression engine or multiple decompression engines. For example, the audio processing module 230 may include a single decompression engine with a single decompression processor. Such a single decompression processor may be hardware or software based and may perform simultaneous decompression by time-sharing the single decompression processor between multiple streams of compressed information. Alternatively, the audio processing module 230 may include multiple decompression engines. Such multiple decompression engines may perform decompression processing on a single information stream or multiple information streams simultaneously.

The audio presentation device 240 is communicatively coupled to the audio processing module 230. The audio presentation device 240 may receive information of the first audio output and the second audio output from the audio processing module 230. The audio presentation device 240 may then generate sound corresponding to the first audio output and the second audio output. The audio presentation device 240 may, for example, include a speaker with which to present information to a user in audible form. The audio presentation device 240 may, for example, generate a first sound on a speaker that corresponds to the information of the first audio output that the audio presentation device 240 receives from the audio processing module 230. The audio presentation device 240 may also, for example, generate a second sound on a speaker that corresponds to the information of the second audio output that the audio presentation device 240 receives from the audio processing module 230.

The audio processing module 230 is independent of the first audio output device 210 and the second audio output device 220. However, the audio processing module 230 may be integrated with the audio presentation device 240. The audio processing module 230 may alternatively be a standalone device, independent of all other system devices. The audio processing module 230 may, for example, be integrated into a single integrated circuit or a single circuit board.

Figure 3:
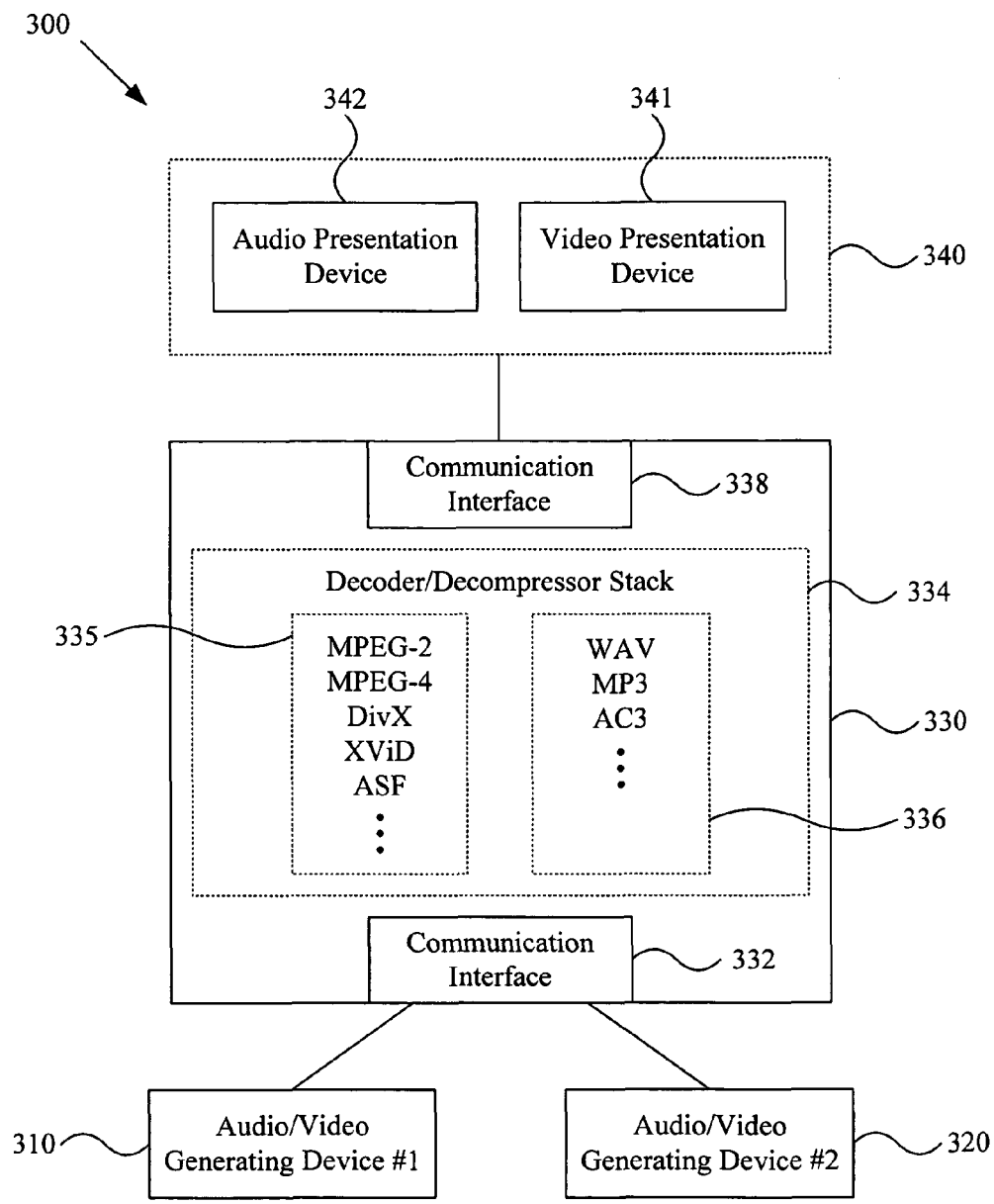
FIG. 3 is a diagram illustrating an audio/video processing system in accordance with various aspects of the present invention.

FIG. 3 is a diagram illustrating an audio/video processing system 300 in accordance with various aspects of the present invention. The audio/video processing system 300 includes a first audio/video generating device 310 and a second audio/video generating device 320. The audio/video processing system 300 also includes an audio/video processing module 330 communicatively coupled to the first audio/video generating device 310 and the second audio/video generating device 320. The audio/video processing system 300 further includes an audio/video presentation system 340 communicatively coupled to the audio/video processing module 330.

The first audio/video generating device 310 produces a first audio/video output. The first audio/video output may include compressed audio/video information representative of a sequence of video frames. The compressed audio/video information, in turn, may include information of inter-frame comparison. For example and without limitation, the compressed audio/video information may include information compressed utilizing MPEG, DivX, XViD, ASF, WAV, MP3 or AC3 compression. The first audio/video generating device 310 may include, for example, a camera monitor system, a computing system, a personal video recording system, a digital video disk player, a personal digital assistant, a pocket computer, a telephone, a video conferencing receiver, an intercom system, a satellite receiver, a television receiver or a portable music player.

The second audio/video generating device 320 may produce a second audio/video output. The second audio/video output may include non-compressed audio/video information. Alternatively, for example, the second audio/video output may include compressed audio/video information representative of a sequence of video frames and corresponding sound. The compressed audio/video information, in turn, may include information of inter-frame comparison. For example and without limitation, the compressed audio/video information may include information compressed utilizing MPEG, DivX, XViD, ASF, WAV, MP3 or AC3 compression. The second audio/video output may include audio/video information compressed utilizing the same compression technique as used to generate the first audio/video output. Alternatively, for example, the second audio/video output may include audio/video information compressed utilizing a different compression technique than used to generate the first audio/video output. The second audio/video generating device 320 may include, for example, a camera monitor system, a computing system, a personal video recording system, a digital video disk player, a personal digital assistant, a pocket computer, a telephone, a video conferencing receiver, an intercom system, a satellite receiver, a television receiver or a portable music player.

The first audio/video generating device 310 and second audio/video generating device 320 may include aspects similar to the first video generating device 110, second video generating device 120, first audio generating device 210 and second audio generating device 220 discussed previously with respect to FIGS. 1 and 2.

The audio/video processing module 330 is independent of the first audio/video generating device 310 and the second audio/video generating device 320. The audio/video processing module 330 is communicatively coupled to the first audio/video generating device 310 and the second audio/video generating device 320. The audio/video processing module 330 may include a first communication interface 332 for managing communications between the audio/video processing module 330 and the first audio/video generating device 310 and the second audio/video generating device 320. The first communication interface 332 may, for example, provide the capability to communicate with the first and second audio/video generating devices 310, 320 over wired links, wireless links, tethered optical links and non-tethered optical links. The audio/video processing module 330 may receive information of the first and second audio/video outputs from the first and second audio/video generating devices 310, 320 through the first communication interface 332.

The audio/video processing module 330 is capable of decompressing the information included in the first audio/video output and outputting a signal that includes corresponding decompressed information. Further, the audio/video processing module 330 may be capable of decompressing the information included in the second audio/video output and outputting a signal that includes corresponding decompressed information. In addition, the audio/video processing module 330 may be capable of decompressing the information included in the first video output and second video output simultaneously. Alternatively, for example, the audio/video processing module 330 may process the first video output using decompression and process the second video output not using decompression.

The audio/video processing module 330 may perform decompression processing utilizing a single decompression engine or multiple decompression engines. For example, the video processing module 330 may include a single decompression engine with a single decompression processor. Such a single decompression processor may be hardware or software based and may perform simultaneous decompression by time-sharing the single decompression processor between multiple streams of compressed information. Alternatively, the audio/video processing module 330 may include multiple decompression engines. Such multiple decompression engines may perform decompression processing on a single information stream or multiple information streams simultaneously.

The exemplary audio/video processing module 330 illustrated in FIG. 3 includes a decoder/decompressor stack 334. The decompressor stack 334 includes a video decompressor sub-stack 335 and an audio decompressor sub-stack 336. The decompressor stack 334 provides the audio/video processing module 330 the capability to decompress information that has been compressed using a wide variety of compression techniques. For example, the video decompressor sub-stack 335 may include structure and functionality for decoding information encoded with the MPEG-2, MPEG-4, DivX, XViD and ASF compression techniques. This list is by no means exhaustive. Also for example, the audio decompressor sub-stack 336 may include structure and functionality for decoding information encoded with WAV, MP3 or AC3 compression techniques. This list is also by no means exhaustive.

The audio/video processing module 330 may include the capability to automatically detect the type of compression used to form the first audio/video output and select the appropriate type of decompression to perform. For example, the audio/video processing module 330 may detect that the first audio/video output contains information that was compressed using MPEG-4 encoding. The audio/video processing module 330 may then direct the first audio/video output information to an MPEG-4 decompression engine to perform the appropriate decompression. Also for example, the audio/video processing module 330 may detect that the second audio/video output contains information that was compressed using DivX encoding. The audio/video processing module 330 may then direct the second audio/video output information to a DivX decompression engine. Alternatively, for example, the audio/video processing module 330 may detect that the second audio/video output does not contain compressed information. The audio/video processing module 330 may then determine not to perform decompression on the second audio/video output information. The audio/video processing module 330 may so process a multitude of audio/video output signals in series, on a time-share basis, or in parallel.

The audio/video processing module 330 may include aspects similar to the video processing module 130 and audio processing module 230 discussed previously with respect to FIGS. 1 and 2. For example and without limitation, the video processing module 130 may include aspects analogous to the communication interfaces 332, 338 and video decompressor sub-stack 335. Similarly, the audio processing module 230 may include aspects analogous to the communication interfaces 332, 338 and audio decompressor sub-stack 336.

The audio/video presentation system 340 is communicatively coupled to a second communication interface 338 of the audio/video processing module 330. The audio/video presentation system 340 may receive information of the first audio/video output and the second audio/video output from the audio/video processing module 330. The audio/video presentation system 340 may then generate human-perceivable signals corresponding to the first audio/video output and the second audio/video output.

The audio/video presentation system 340 may include a video presentation device 341 (e.g., a screen) on which to present information to a user in visually perceivable form. The video presentation device 341 may, for example, generate a first display window on a screen that corresponds to the information of the first video output that the audio/video presentation system 340 receives from the audio/video processing module 330. The video presentation device 341 may also, for example, generate a second display window on a screen that corresponds to the information of the second audio/video output that the audio/video presentation system 340 receives from the audio/video processing module 330.

The audio/video presentation system 340 may include an audio presentation device 342 (e.g., a speaker) on which to present information to a user in audible form. The audio presentation device 342 may, for example, receive information of the first audio/video output and the second audio/video output from the audio/video processing module 330. The audio presentation device 342 may then generate sound corresponding to the first audio/video output and the second audio/video output. The audio presentation device 342 may, for example, include a speaker on which to present information to a user in audible form. The audio presentation device 342 may, for example, generate a first sound on a speaker that corresponds to the information of the first audio/video output that the audio/video presentation system 340 receives from the audio/video processing module 330. The audio presentation device 342 may also, for example, generate a second sound on a speaker that corresponds to the information of the second audio/video output that the audio/video presentation system 340 receives from the audio/video processing module 330.

The audio/video presentation system 340 may include the video presentation device 341 and audio presentation device 342 in a single integrated device or in a distributed set of devices. The audio/video processing module 330 is independent of the first audio/video output device 310 and the second audio/video output device 320. However, the audio/video processing module 330 may be integrated with aspects of the audio/video presentation system 340. For example, aspects of the audio/video processing module 330 may be integrated with the video presentation device 341 or the audio presentation device 342. The audio/video processing module 330 may alternatively be a stand-alone device, independent of all other system devices. The audio/video processing module 330 may, for example, be integrated into a single integrated circuit or a single circuit board.

Figure 4:
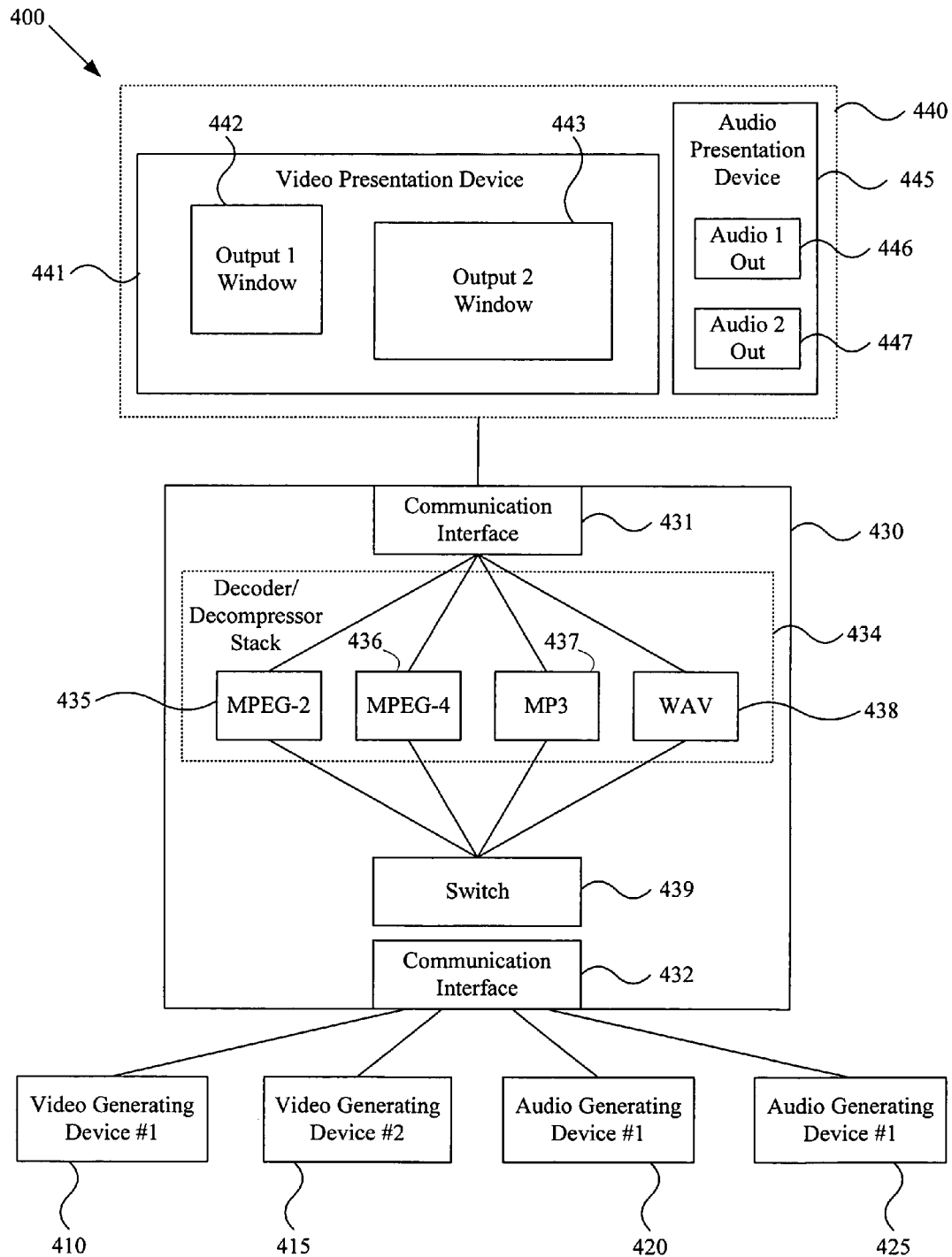
FIG. 4 is a diagram illustrating an exemplary audio/video processing system and information consumption environment in accordance with various aspects of the present invention.

FIG. 4 is a diagram illustrating an exemplary audio/video processing system and information consumption environment 400 in accordance with various aspects of the present invention. The exemplary audio/video processing system 400 may include the various aspects of the systems shown in FIGS. 1-3 and discussed previously. Conversely, the various systems shown in FIG. 1-3 and discussed previously may include various aspects of the exemplary audio/video processing system 400.

The audio/video processing system 400 includes a first video generating device 410, a second video generating device 415, a first audio generating device 420, and a second audio generating device 425. The audio/video processing system 400 also includes an audio/video processing module 430 communicatively coupled to the first video generating device 410, the second video generating device 415, the first audio generating device 420 and the second audio generating device 425. The audio/video processing system 400 further includes an audio/video presentation system 440 communicatively coupled to the audio/video processing module 430.

The first video generating device 410 produces a first video output. The first video output may include compressed video information representative of a sequence of video frames. The compressed video information, in turn, may include information of inter-frame comparison. For example and without limitation, the compressed video information may include information compressed utilizing MPEG, DivX, XViD or ASF compression. The first video generating device 410 may include, for example, a camera monitor system, a computing system, a personal video recording system, a digital video disk player, a personal digital assistant, a pocket computer, a telephone, a video conferencing receiver, an intercom system, a satellite receiver or a television receiver.

The second video generating device 415 produces a second video output. The second video output may include non-compressed video information. Alternatively, for example, the second video output may include compressed video information representative of a sequence of video frames. The compressed video information, in turn, may include information of inter-frame comparison. For example and without limitation, the compressed video information may include information compressed utilizing MPEG, DivX, XViD or ASF compression. The second video output may include video information compressed utilizing the same compression technique as used to generate the first video output. Alternatively, for example, the second video output may include video information compressed utilizing a different compression technique than used to generate the first video output. The second video generating device 415 may include, for example, a camera monitor system, a computing system, a personal video recording system, a digital video disk player, a personal digital assistant, a pocket computer, a telephone, a video conferencing receiver, an intercom system, a satellite receiver or a television receiver.

The first audio generating device 420 produces a first audio output. The first audio output may include compressed audio information. For example and without limitation, the compressed audio information may include information compressed utilizing WAV, MP3 or AC3 compression. The first audio generating device 420 may include, for example, a camera monitor system, a computing system, a personal video recording system, a digital video disk player, a personal digital assistant, a pocket computer, a telephone, a video conferencing receiver, an intercom system, a satellite receiver, a television receiver or a personal music player.

The second audio generating device 425 produces a second audio output. The second audio output may include non-compressed audio information. Alternatively, for example, the second audio output may include compressed audio information. For example and without limitation, the compressed audio information may include information compressed utilizing WAV, MP3 or AC3 compression. The second audio output may include audio information compressed utilizing the same compression technique as used to generate the first audio output. Alternatively, for example, the second audio output may include audio information compressed utilizing a different compression technique than used to generate the first audio output. The second audio generating device 425 may include, for example, a camera monitor system, a computing system, a personal video recording system, a digital video disk player, a personal digital assistant, a pocket computer, a telephone, a video conferencing receiver, an intercom system, a satellite receiver, a television receiver or a portable music player.

The audio and video generating devices 410, 415, 420, 425 may include aspects similar to the first video generating device 110, second video generating device 120, first audio generating device 210, second audio generating device 220, first audio/video generating device 310 and second audio/video generating device 320 discussed previously with respect to FIGS. 1-3.

The audio/video processing module 430 is independent of the first video generating device 410, the second video generating device 415, the first audio generating device 420 and the second audio generating device 425. The audio/video processing module 430 is communicatively coupled to the first video generating device 410, the second video generating device 415, the first audio generating device 420 and the second audio generating device 425. The audio/video processing module 430 may include a first communication interface 432 for managing communications between the audio/video processing module 430 and the audio and video generating devices 410, 415, 420, 425. The first communication interface 432 may, for example, provide the capability to communicate with the audio and video generating devices 410, 415, 420, 425 over wired links, wireless links, tethered optical links and non-tethered optical links. The audio/video processing module 430 may receive information of the first and second audio and video outputs from the audio and video generating devices 410, 415, 420, 425 through the first communication interface 432.

The audio/video processing module 430 is capable of decompressing the information included in the first video output and outputting a signal that includes corresponding decompressed information. Further, the audio/video processing module 430 may be capable of decompressing the information included in the second video output and outputting a signal that includes corresponding decompressed information. In addition, the audio/video processing module 430 may be capable of decompressing the information included in the first and second audio outputs and outputting a signal that includes corresponding decompressed information. Further, the audio/video processing module 430 may be capable of decompressing the information included in the various audio and video outputs simultaneously. Alternatively, for example, the audio/video processing module 430 may process a first portion of the video and audio outputs using decompression and a second portion of the video and audio outputs not using decompression.

The audio/video processing module 430 may perform decompression processing utilizing a single decompression engine or multiple decompression engines. For example, the audio/video processing module 430 may include a single decompression engine with a single decompression processor. Such a single decompression processor may be hardware or software based and may perform simultaneous decompression by time-sharing the single decompression processor between multiple streams of compressed information. Alternatively, the audio/video processing module 430 may include multiple decompression engines. Such multiple decompression engines may perform decompression processing on a single information stream or multiple information streams simultaneously.

The exemplary audio/video processing module 430 illustrated in FIG. 3 includes a decoder/decompressor stack 434. The exemplary decompressor stack 434 includes an MPEG-2 decompressor 435, MPEG-4 decompressor 436, MP3 decompressor 437 and WAV decompressor 438. Accordingly, the exemplary decompressor stack 434 provides the audio/video processing module 430 the capability to decompress information that has been compressed using a wide variety compression techniques such as, for example, MPEG-2, MPEG-4, MP3 or WAV compression.

The audio/video processing module 430 may include the capability to automatically detect the type of compression used to form the various audio and video outputs and select the appropriate type of decompression to perform on each output. Such capability may, for example, be incorporated in an intelligent switch 439. The switch 439 may include a hardware or software driven switching circuit and may, for example, route received audio and/or video information streams as separate output streams or as a combined multiplexed stream.

For example, the switch 439 may detect that the first video output contains information that was compressed using MPEG-2 compression and detect that the second video output contains information that was compressed using MPEG-4 compression. The switch 439 may then direct the first video output information to the MPEG-2 decompressor 435 and the second video output information to the MPEG-4 decompressor 436 to perform the appropriate decompression. The switch 439 may likewise detect that the first audio output contains information that was compressed using MP3 compression and that the second audio output contains information that was compressed using WAV compression. The switch 439 may then direct the first audio output information to the MP3 decompressor 437 and the second audio output to the WAV decompressor 438. Alternatively, for example, the switch 439 may detect that one or more of the audio or video outputs does not contain compressed information. The switch 439 may then determine not to direct the information to a decompressor. The audio/video processing module 430 may so process a multitude of audio and video output signals in series, on a time-share basis, or in parallel.

The audio/video processing module 430 may include aspects similar to the video processing module 130, audio processing module 230 and audio/video processing module 330 discussed previously with respect to FIGS. 1-3. For example and without limitation, the video processing module 130 and audio/video processing module 330 may include aspects analogous to the communication interfaces 432, 431 and video decompressors 435, 436. Similarly, the audio processing module 230 and audio/video processing module 330 may include aspects analogous to the communication interfaces 432, 431 and audio decompressors 437, 438.

The audio/video presentation system 440 is communicatively coupled to a second communication interface 431 of the audio/video processing module 430. The audio/video presentation system 440 may receive information of the first video output and the second video output from the audio/video processing module 430. The audio/video presentation system 440 may then generate a display corresponding to the first video output and the second video output. Similarly, the audio/video presentation system 440 may receive information of the first audio output and the second audio output from the audio/video processing module 430. The audio/video presentation system 440 may then generate sound corresponding to the first audio output and the second audio output.

The audio/video presentation system 440 may include a video presentation device 441 (e.g., a screen) on which to present information to a user in visually perceivable form. The video presentation device 441 may, for example, generate a first display window 442 on a screen that corresponds to the information of the first video output that the audio/video presentation system 440 receives from the audio/video processing module 430. The video presentation device 441 may also, for example, generate a second display window 443 on a screen that corresponds to the information of the second video output that the audio/video presentation system 440 receives from the audio/video processing module 430.

The audio/video presentation system 440 may include an audio presentation device 445 (e.g., a speaker system) with which to present information to a user in audible form. The audio presentation device 445 may, for example, receive information of the first audio output and the second audio output from the audio/video processing module 430. The audio presentation device 445 may then generate sound corresponding to the first audio output and the second audio output. The audio presentation device 445 may, for example, include a speaker system on which to present information to a user in audible form. The audio presentation device 445 may, for example, generate a first sound on a first speaker 446 that corresponds to the information of the first audio output that the audio/video presentation system 440 receives from the audio/video processing module 430. The audio presentation device 445 may also, for example, generate a second sound on a second speaker 447 that corresponds to the information of the second audio output that the audio/video presentation system 440 receives from the audio/video processing module 430.

The audio/video presentation system 440 is an exemplary system, and therefore, various aspects of the exemplary audio/video presentation system 440 should not limit the scope of various aspects of the present invention. For example, the exemplary audio/video presentation system 440 may include the video presentation device 441 and audio presentation device 445 in a single unit or device. Alternatively, the video presentation device 441 and audio presentation device 445 may be stand-alone units.

The audio/video processing module 430 is independent of the various audio and video output devices 410, 415, 420, 425. However, the audio/video processing module 430 may be integrated with aspects of the audio/video presentation system 440. For example, aspects of the audio/video processing module 430 may be integrated with the video presentation device 441 or the audio presentation device 445. The audio/video processing module 430 may alternatively be a stand-alone device, independent of all other system devices. The audio/video processing module 430 may, for example, be integrated into a single integrated circuit or a single circuit board.

In summary, aspects of the present invention provide a system for processing and presenting information received from a plurality of source devices.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A video processing system, comprising:
   a first video generating device that produces a first video output, the first video output comprising compressed video information representative of a sequence of video frames, the compressed video information comprising information of inter-frame comparison;
   a second video generating device that produces a second video output; and
   an end-user system comprising:
   a processing module comprising a decompressor stack, wherein the decompressor stack includes a plurality of video decompressors, wherein the decompressor stack is communicatively coupled to the first and second video generating devices, and wherein the decompressor stack is independent of the first and second video generating devices and configured to match the plurality of video decompressors to the first video output and the second video output and simultaneously decompress the first video output and the second video output using the plurality of video decompressors; and
   a video presentation device, communicatively coupled to the processing module, that is simultaneously capable of generating a first display corresponding to the first video output via the processing module and a second display corresponding to the second video output via the processing module.

2. The video processing system of claim 1, wherein the processing module is capable of a first type of decompression for decompressing information compressed with a first type of compression and a second type of decompression for decompressing information compressed with a second type of compression.

3. The video processing system of claim 2, wherein the processing module automatically detects the type of compression used to form the first video output and selects between the first type of decompression and the second type of decompression based on the detected type of compression.

4. The video processing system of claim 2, wherein the processing module comprises a single decompression engine capable of simultaneously, in a time-sharing manner, decompressing video information encoded with any of a plurality of compression schemes.

5. The video processing system of claim 2, wherein the processing module comprises a plurality of decompression engines corresponding to a plurality of different respective compression schemes and capable of simultaneously, in a parallel manner, decompressing video information.

6. The video processing system of claim 5, wherein the processing module further comprises a video information switching circuit communicatively coupled to the plurality of decompression engines, the video information switching circuit simultaneously directing received video information from the first and second video generating devices to respective decompression engines based on the respective type of decompression used to form the received video information.

7. The video processing system of claim 2, wherein the processing module is further capable of decompressing the second video output.

8. The video processing system of claim 7, wherein the processing module is further capable of processing at least one of the first video output and the second video output using decompression and processing at least one of the first video output and the second video output not using decompression.

9. The video processing system of claim 1, wherein the second video output comprises second compressed video information representative of a sequence of video frames, the second compressed video information comprising information of inter-frame comparison.

10. The video processing system of claim 1, wherein the video presentation device and processing module are integrated into a single device.

11. The video processing system of claim 1, wherein the video presentation device comprises a first window that presents information of the first video output.

12. The video processing system of claim 11, wherein the video presentation device further comprises a second window that presents information of the second video output.

13. An audio processing system, comprising:
   a first audio generating device that produces a first audio output, the first audio output comprising compressed audio information;
   a second audio generating device that produces a second audio output;
   a processing module comprising a decompressor stack, wherein the decompressor stack includes a plurality of audio decompressors, wherein the decompressor stack is communicatively coupled to the first and second audio generating devices, and wherein the decompressor stack is independent of the first and second audio generating devices and configured to match the plurality of audio decompressors to the first audio output and the second audio output and simultaneously decompress the first audio output and the second audio output using the plurality of audio decompressors; and
   an audio presentation device, communicatively coupled to the processing module, that is capable of generating sound corresponding to the first audio output via the processing module and capable of generating sound corresponding to the second audio output via the processing module.

14. The audio processing system of claim 13, wherein the processing module is capable of a first type of decompression for decompressing information compressed with a first type of compression and a second type of decompression for decompressing information compressed with a second type of compression.

15. The audio processing system of claim 14, wherein the processing module automatically detects the type of compression used to form the first audio output and selects between the first type of decompression and the second type of decompression based on the detected type of compression.

16. The audio processing system of claim 14, wherein the processing module comprises a single decompression engine capable of simultaneously, in a time-sharing manner, decompressing audio information encoded with any of a plurality of compression schemes.

17. The audio processing system of claim 14, wherein the processing module comprises a plurality of decompression engines corresponding to a plurality of different respective compression schemes and capable of simultaneously, in a parallel manner, decompressing audio information.

18. The audio processing system of claim 17, wherein the processing module further comprises an audio information switching circuit communicatively coupled to the plurality of decompression engines, the audio information switching circuit simultaneously directing received audio information from the first and second audio generating devices to respective decompression engines based on the type of decompression used to form the received audio information.

19. The audio processing system of claim 14, wherein the processing module IS further capable of decompressing the second audio output.

20. The audio processing system of claim 19, wherein the processing module is further capable of processing at least one of the first audio output and the second audio output using decompression and processing at least one of the first audio output and the second audio output not using decompression.

21. The audio processing system of claim 13, wherein the second audio output comprises second compressed audio information.

22. The audio processing system of claim 13, wherein the audio presentation device and processing module are integrated into a single device.

23. The audio processing system of claim 13, wherein the audio presentation device comprises a first speaker that presents information of the first audio output and a second speaker that simultaneously presents information of the second audio output.

24. The audio processing system of claim 13, wherein the processing module is in an apparatus separate from the first and second audio generating devices.

25. The audio processing system of claim 13, wherein the processing module and audio presentation device are components of an end-user system.

26. A system for use in a video processing environment having at least a first video generating device, a second video generating device and a video presentation device, where the first video generating device produces a first video output comprising compressed video information representative of a sequence of video frames and comprising information of inter-frame comparison, the second video generating device produces a second video output, and the video presentation device is simultaneously capable of generating a first display corresponding to the first video output and a second display corresponding to the second video output, the system comprising:

an end-user system that is independent of the first and second video generating devices, where the end-user system is operable to, at least:
communicatively couple to the first and second video generating devices;
simultaneously process the first video output from the first video generating device and the second video output from the second video generating device, where the simultaneous processing, via a processing module, comprises matching the first video output to a video decompressor of a plurality of video decompressors via a decompressor stack, and comprises decompressing the first video output from the first video generating device using the video decompressor;
communicatively couple to the video presentation device; and
output one or more signals to the video presentation device, the one or more signals enabling the video presentation device to simultaneously generate a first display corresponding to the first video output and a second display corresponding to the second video output.

27. A system for use in an audio processing environment having at least a first audio generating device, a second audio generating device and an audio presentation device, where the first audio generating device produces a first audio output comprising compressed audio information, the second audio generating device produces a second audio output, and the audio presentation device is capable of generating sound corresponding to the first audio output and the second audio output, the system comprising:

a processing module comprising a decompressor stack comprising a plurality of audio decompressors, operable to, at least:
communicatively couple to the first and second audio generating devices;
match the plurality of audio decompressors to the first audio output and the second audio output;
simultaneously process the first audio output from the first audio generating device and the second audio output from the second audio generating device, where the simultaneous processing comprises decompressing the first audio output from the first audio generating device using an audio decompressor of the plurality of audio decompressors;
communicatively couple to the audio presentation device; and
output one or more signals to the audio presentation device, the one or more signals enabling the audio presentation device to generate sound corresponding to the first audio output and generate sound corresponding to the second audio output.

* * * * *